United States Patent [19]
Hancock et al.

[11] Patent Number: 5,983,614
[45] Date of Patent: Nov. 16, 1999

[54] LOCKABLE FRONT WHEEL SWIVEL FOR LAWN MOWERS

[75] Inventors: Frank H. Hancock, Jackson; Stephen C. Price, Barnesville; Kevin D. Craddock, Acworth, all of Ga.

[73] Assignee: Snapper, Inc., McDonough, Ga.

[21] Appl. No.: 08/989,500

[22] Filed: Dec. 12, 1997

[51] Int. Cl.$^6$ ............................................. A01D 34/03
[52] U.S. Cl. .......................... 56/16.7; 16/35 R; 56/17.2
[58] Field of Search .................... 56/16.7, 17.2, 56/322, DIG. 3, DIG. 10, DIG. 7; 16/35 R

[56] References Cited

U.S. PATENT DOCUMENTS

| | | |
|---|---|---|
| Re. 34,433 | 11/1993 | Heiligenthal et al. . |
| 2,972,163 | 2/1961 | Ross et al. ............................. 16/35 R |
| 3,409,105 | 11/1968 | Clinton ................................. 16/35 R |
| 3,828,392 | 8/1974 | Bolger . |
| 3,890,669 | 6/1975 | Reinhards . |
| 4,037,291 | 7/1977 | Huempfner et al. . |
| 4,205,413 | 6/1980 | Collignon et al. . |
| 4,248,445 | 2/1981 | Vassar .................................. 16/35 R |
| 4,309,791 | 1/1982 | Aulik . |
| 4,336,629 | 6/1982 | Jarvis, Jr. et al. ..................... 16/35 R |
| 4,349,937 | 9/1982 | Fontana ................................. 16/35 R |
| 4,349,938 | 9/1982 | Fontana . |
| 4,414,702 | 11/1983 | Neumann .............................. 16/35 R |
| 4,483,042 | 11/1984 | Dieter .................................... 16/35 R |
| 4,788,741 | 12/1988 | Hilborn ................................. 16/35 R |
| 4,805,259 | 2/1989 | Kassai ................................... 16/35 R |
| 4,815,161 | 3/1989 | Timmer et al. ........................ 16/35 R |
| 4,922,574 | 5/1990 | Heiligenthal et al. . |
| 5,014,391 | 5/1991 | Schulte . |
| 5,191,674 | 3/1993 | Zun ....................................... 16/35 R |
| 5,263,226 | 11/1993 | Roy et al. .............................. 16/35 R |
| 5,517,718 | 5/1996 | Eichhorn . |
| 5,799,366 | 10/1996 | Zocco et al. .......................... 16/35 R |

Primary Examiner—Thomas B. Will
Assistant Examiner—Arpad Fabian Kovacs
Attorney, Agent, or Firm—Jones & Askew

[57] ABSTRACT

This invention relates in general to lawn mowers, and particularly relates to a front wheel swivel assembly which can be selectively locked into a straight-ahead orientation during operation of the mower and by use of controls within the operator's reach during normal cutting operation of the mower.

9 Claims, 3 Drawing Sheets

(unlocked)

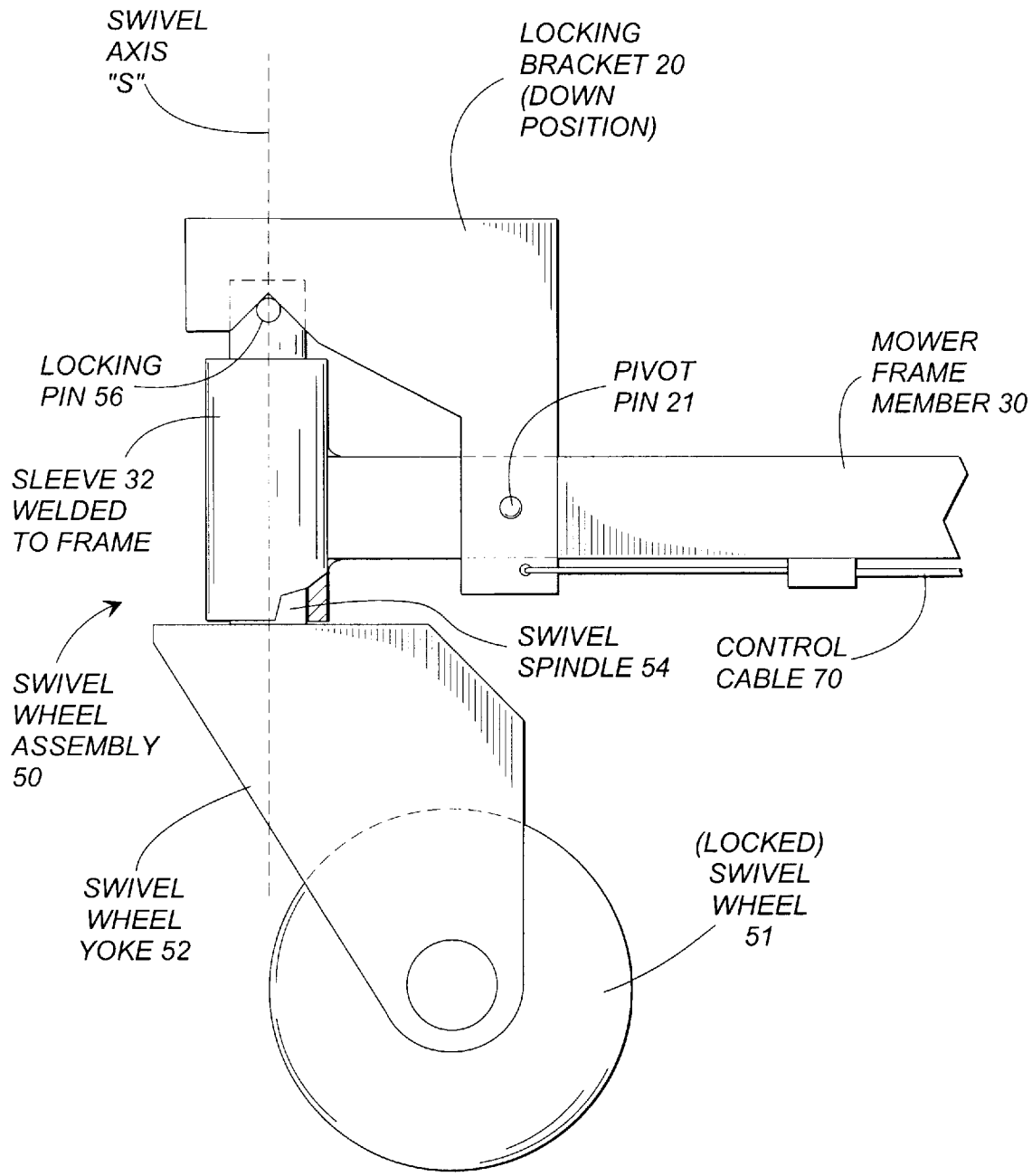
FIG. 1 (locked)

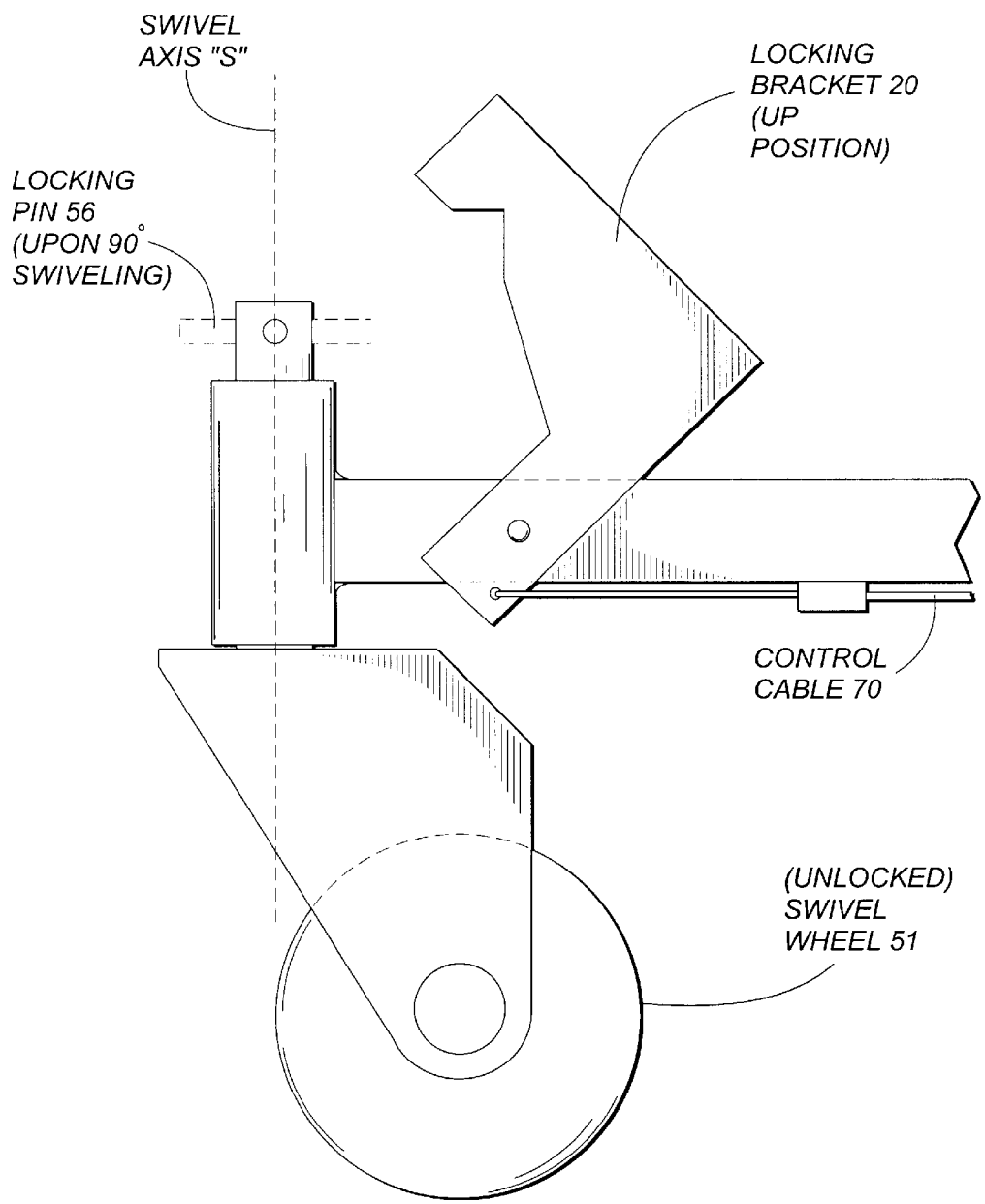
FIG. 2 (unlocked)

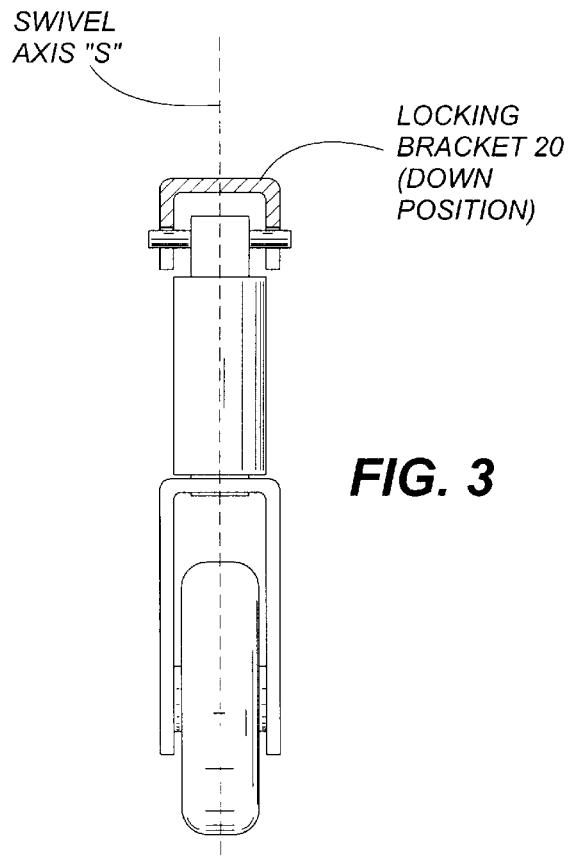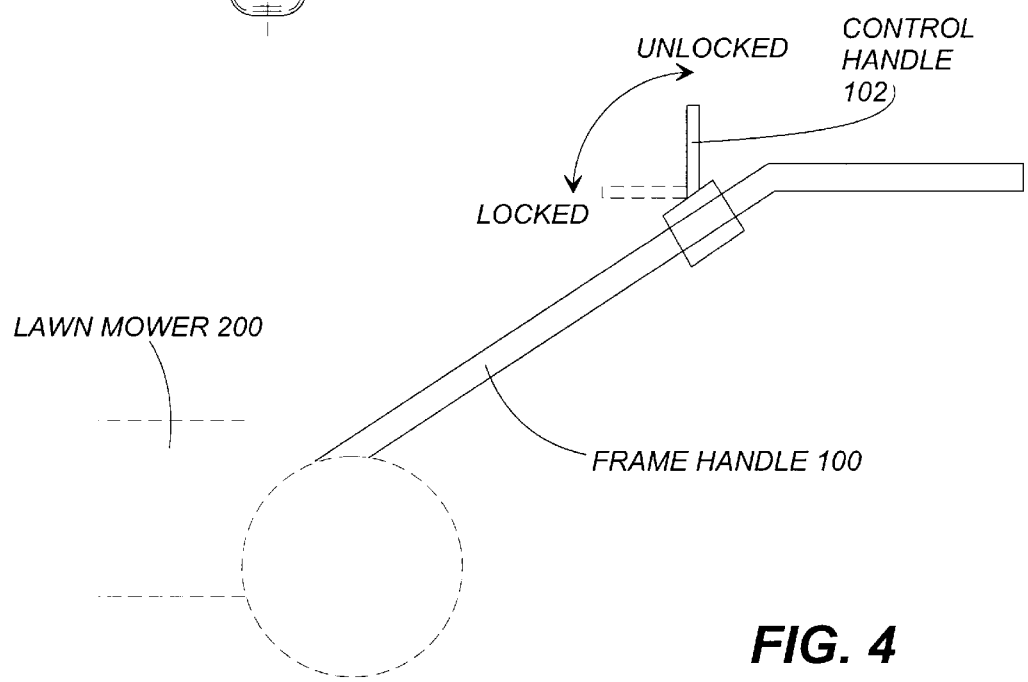

LOCKABLE FRONT WHEEL SWIVEL FOR LAWN MOWERS

TECHNICAL FIELD

This invention relates in general to lawn mowers, and particularly relates to a front wheel swivel assembly which can be selectively locked into a straight-ahead orientation during operation of the mower and by use of controls within the operator's reach during normal cutting operation of the mower.

BACKGROUND OF THE INVENTION

In the use of lawn mowers, particularly the use of commercial-type walk-behind or sulky-assisted lawn mowers, there is often the use of one or more (typically two) swivel wheels mounted to the front of the mower. There is a need to allow for selective "locking" of such wheels during operation of the mowers on a slope, particularly a side slope, due to the tendency of such apparatuses to tend to turn down the hill when cutting on a side slope.

Prior art solutions to this problem relate to the use of individual locking mechanism which individually lock such wheels in a "straight-ahead" orientation. However, this requires the operator to leave his conventional cutting position, stop the apparatus, manipulate the locking mechanisms, and only then return to cutting. This can involve the insertion of a locking, pin between the swivel pin and tube assembly; or the use of a snap, lock lever, etc. This tends to be time consuming, inefficient, and in some cases unsafe.

Therefore, there is a need in the art for a selectively lockable swivel wheel assembly which allows a lawn mower operator to selectively lock or unlock one or more swivel wheels without leaving his or her operating position

SUMMARY OF THE INVENTION

The present invention overcomes deficiencies in the prior art by providing a selectively lockable swivel wheel assembly which allows a lawn mower operator to selectively lock or unlock one or more swivel wheels without leaving his or her operating position.

Therefore it is an object of the present invention to provide an improved lawn mower.

It is a further object of the present invention to provide an improved lawn mower having a selective swivel wheel locking mechanism.

It is a further object of the present invention to provide an improved lawn mower having a selective swivel wheel locking mechanism which is easy to operate.

It is a further object of the present invention to provide an improved lawn mower having a selective swivel wheel locking mechanism which is simple to operate.

It is a further object of the present invention to provide an improved lawn mower having a selective swivel wheel locking mechanism which can be operated while the operator is in the typical mowing position.

It is a further object of the present invention to provide an improved lawn mower having a selective swivel wheel locking mechanism which can be operated while the operator is mowing.

It is a further object of the present invention to provide an improved lawn mower having a selective swivel wheel locking mechanism which can be operated in conjunction with other similar mechanisms.

Other objects, features, and advantages of the present invention will become apparent upon reading the following detailed description of the preferred embodiment of the invention when taken in conjunction with the drawing and the appended claims.

BRIEF DESCRIPTION OF THE DRAWINGS

FIG. 1 is a side isolated view of the locking assembly according to the present invention in its "locked" position.

FIG. 2 is a side isolated view of the locking assembly according to the present invention in its "unlocked" position.

FIG. 3 is a front isolated view of a portion of the apparatus according to the present invention, in its locked position.

FIG. 4 is a side view of the frame handle 100 of the overall cutting apparatus, having a pivoting control handle 102 pivotably attached thereto.

DETAILED DESCRIPTION OF THE PREFERRED EMBODIMENT

Reference is first generally made to FIGS. 1–3. General operation of the apparatus according to the invention includes the use of a locking bracket 20, which is pivotably mounted relative to the frame 30 of a typical lawn mower (not shown), and serves to selectively lock the otherwise swiveling action of a swivel wheel assembly 50 which includes a wheel 51, a wheel yoke 52, a swivel spindle 54 and a locking pin 56. In FIGS. 1 and 3, the apparatus is in its "locked" position, whereas in FIG. 2, it is in its "unlocked" position.

Construction

As noted above, the assembly 10 is attached to the frame 30 of a typical lawn mower (not shown). This frame 30 includes a hollow elongate sleeve 32 which is substantially tubular and includes a longitudinal axis which is substantially vertical when in its normal operating position. The sleeve 32 is welded in place in a conventional manner.

A swivel wheel assembly 50 is configured to swivel about the swiveling axis S relative to the frame 30, and includes a wheel 51, a wheel yoke 52, a swivel spindle 54 and a locking pin 56. The wheel 51 is mounted for rotation within the yoke 52 as is known in the art. The elongate cylindrical swivel spindle 54 is rigidly mounted to the top of the yoke 52 as is known in the art. The locking pin 56 is rigidly attached to the top marginal end of the swivel spindle such that it forms a type of "T" at the top of the spindle 54. As may be understood, as the swivel wheel assembly 50 swivels about the swiveling axis S relative to the frame 30, so does the locking pin 56 swivel. When unlocked, the swivel wheel assembly 50 is free to swivel 360 degrees.

The locking pin 56 is in one embodiment a roll pin, although other configurations are contemplated without departing from the spirit and scope of the present invention.

The pivoting locking bracket 20 is generally shaped in an inverted channel configuration, and defines two downwardly-oriented V-shaped notches which engage and contain the locking pin 56 in order to provide the locking function. The locking bracket 20 is pivotably mounted to the frame member 30 along a substantially horizontal axis which is normal to the plane of paper of FIGS. 1 and 2, by means of a pivot pin 21.

A control cable 70 is used to control the pivoting motion of the pivoting locking bracket 20. As may be understood, the control cable includes a sheath fastened relative to the frame 30, and an internal cable extendable and retractable within the sleeve. Extension of the internal cable causes disengagement of the pivoting locking bracket 20 to the position shown in FIG. 1, and retraction of the internal cable causes engagement of the pivoting locking bracket 20 to the position shown in FIG. 1. The control cable 70 and its associated pivoting handle control can be located on either on the left or the right handle position, and it should be understood that more than one pivoting locking bracket 20 can be controlled by a single control handle 70.

Suitable springs (not shown), including torsion springs, are used to provide the desired spring bias on the pivoting locking bracket 20, to assist in extension or retraction as desired. In one embodiment, the pivoting locking bracket 20 is biased into its locked position by spring force.

FIG. 4 is a side view of the frame handle 100 of the overall cutting apparatus, having a pivoting control handle 102 pivotably attached thereto.

As shown by pulling back on the control handle 102, the locking bracket 20 can be placed in its unlocked position as shown in FIG. 2. By pushing forward, the locking bracket 20 can be moved into its locked position as shown in FIG. 1. However, it should also be understood that such a control configuration could just as easily be reversed as desired.

Operation

Prior to operation, it will be assumed that the pivoting locking bracket 20 is in the locked position shown in FIG. 1. The control handle can then be drawn rearwardly, such that the locking bracket is pivoted to the position shown in FIG. 2, thus allowing the wheel 51 to swivel. Movement of the control handle in the opposite direction gives the opposite results and locks the swiveling movement of the swivel wheel 51.

Advantages

The present invention allows an operation to position the front wheel (can be used on either LH or RH application) in a fixed attitude simply by using a control from the handle or operators position without stopping the machine or losing any time in mowing on slopes whatsoever. Such a configuration allows for closer trim and in the general handling of steel deck mowers.

This method of apply and release is simple, effective, novel to the industry, and should be trouble free.

Alternatives

As may be understood, there are alternative configurations contemplated under the spirit and scope of the present invention. For example, electrical controls could be used instead of the mechanical control configuration shown. Other locking configurations besides the "T"-oriented locking pin configuration are also contemplated.

One alternate configuration includes the concept of using a spring-loaded pin (not shown) which tends to "find" a hole in the spindle shaft, unless maintained in a withdrawn state by a control handle configuration. With this configuration, the operator will release the pin via the controls and then the nose of the pin will be allowed to "find" the hole, whereupon it will be pushed in via the biasing spring. The pin will be withdrawn against the spring pressure by control means (such as a cable) such as known in the art.

Another alternate locking configurations include the use of a flexible straplike brake band which can wrap around the spindle and maintain it in whatever position it happens to be in. This brake band can be tightened and released by control means such as in the art. As may be seen, this locking feature, unlike the others disclosed herein, does not lock the castor spindle at a predetermined "straight-ahead" orientation.

Materials

The materials used are conventional in nature. The pivoting locking bracket 20 and locking pin 56 in the preferred embodiment are both made of steel.

Conclusion

This invention has been described in specific detail with reference to the disclosed embodiments, it will be understood that many variations and modifications may be effected within the spirit and scope of the invention as described in the appended claims.

What is claimed is:

1. An apparatus for use with a lawn mower occasionally operated in a vegetation cutting mode on an inclined slope by an operator while at an operating position, said lawn mower including a frame, said apparatus comprising:

A) a swiveling wheel assembly for supporting at least a portion of the weight of said lawn mower and being configured to swivel substantially 360 degrees about a vertical axis, said swiveling wheel assembly itself comprising:

i) a swivel wheel for contacting said inclined slope;

ii) a swivel wheel yoke for rotatably supporting said swivel wheel about a substantially horizontal rotational axis when said lawn mower is on a level surface;

iii) a swivel spindle having an upper end and a lower end substantially rigidly attached to said swivel wheel yoke;

iv) a sleeve for rotatably supporting said swivel spindle about a substantially vertical rotational axis when said lawn mower is on said level surface; and v) a transverse locking pin substantially rigidly attached to the upper marginal end of said upper end of said swivel wheel spindle;

B) locking means for selectively locking said swiveling action by selectively locking the movement of said transverse locking pin relative to said frame; and C) control means spaced remotely from said locking means, said control means configured to control said locking means so as to cause said selective locking, said control means accessible by an operator while at said operating position, so that said selective locking may be provided without the need for the operator to leave said operating position.

2. The apparatus as claimed in claim 1, wherein said lawn mower includes an operating handle and said control means is a manual control attached to said operating handle.

3. The apparatus as claimed in claim 2, wherein said manual control is a lever attached to said operating handle, and also wherein said locking means is a locking member which is pivotably mounted relative to said frame, is channel-shaped and includes two U-shaped slots to each contain and lock a portion of said transverse locking pin relative to said frame.

4. An apparatus for selectively locking swiveling movement of a swivel wheel used with a lawn mover having a frame portion, said apparatus comprising:

a swiveling wheel assembly including a swivel wheel spindle having an upper end and a lower end and also including an exposed locking element attached to an upper marginal end of said upper end of said swivel wheel spindle, said swiveling wheel assembly being mounted to swivel relative to said frame portion of said lawn mower;

a pivoting locking member configured for selective containment of said exposed locking element to discourage said swiveling, said pivoting locking member pivotably attached relative to said frame portion of said lawn mower; and a pivoting locking member operator's control for providing said selective containment of said exposed locking element, said control having a portion being spaced remotely from said pivoting locking member such that it is accessible by an operator of said lawn mower to allow said operator to selectively contain said exposed locking element without leaving the operator's normal cutting position.

5. The apparatus for selectively locking swiveling movement of a swivel wheel used with a lawn mower as claimed in claim 4, wherein said locking element includes a locking pin located at said upper marginal end of said swivel wheel spindle, and wherein said pivoting locking member includes a slot configured to engage said locking pin to provide said containment.

6. The apparatus for selectively locking swiveling movement of a swivel wheel used with a lawn mower as claimed in claim 5, wherein said locking member is pivotably mounted relative to said frame portion of said lawn mower.

7. The apparatus for selectively locking swiveling movement of a swivel wheel used with a lawn mower as claimed in claim 6, wherein said pivoting locking member is channel-shaped with two side walls and includes two U-shaped slots, one in each side wall, said U-shaped slots configured to each contain a portion of said locking pin.

8. In a lawn mower operable by an operator at a normal steering position including a swivel-type supporting wheel capable of swiveling about a substantially vertical axis, said lawn mover including a frame, said swivel-type supporting wheel including a swivel spindle including an upper end and a lower end, the improvement comprising:

an exposed locking element attached to an upper marginal end of said upper end of said swivel wheel spindle;

a pivoting locking member pivotably mounted relative to said frame, said locking device configured to selectively engage and disengage said exposed locking element to correspondingly lock and unlock said swivel-type supporting wheel, to correspondingly disallow and allow said supporting wheel to swivel; and a control member remote from but operably associated with said pivoting locking member, said control member operable by said operator while at said normal steering position to selectively cause said pivoting locking member to selectively engage and disengage said exposed locking element, causing corresponding locking and unlocking of said swivel-type supporting wheel, such that said operator can selectively lock said swivel-type supporting wheel when said operator desires to cut lawns on an incline, but can likewise selectively unlock said swivel-type supporting wheel when said operator desires to cut lawns when off said incline.

9. The lawn mower as claimed in claim 8, further comprising means for positively locking said swivel-type supporting wheel in at a predetermined orientation.

* * * * *